(12) United States Patent
Maloberti

(10) Patent No.: US 7,395,771 B2
(45) Date of Patent: Jul. 8, 2008

(54) ANCHORING SYSTEM FOR INSTALLING IN A SURFACE MOVED ACCORDING TO HIGH-FREQUENCY MOVEMENTS

(75) Inventor: René Antoine Maloberti, Champigny sur Marne (FR)

(73) Assignee: Technip France (FR)

( * ) Notice: Subject to any disclaimer, the term of this patent is extended or adjusted under 35 U.S.C. 154(b) by 0 days.

(21) Appl. No.: 11/573,334

(22) PCT Filed: Jul. 29, 2005

(86) PCT No.: PCT/FR2005/001992

§ 371 (c)(1),
(2), (4) Date: Feb. 6, 2007

(87) PCT Pub. No.: WO2006/024763

PCT Pub. Date: Mar. 9, 2006

(65) Prior Publication Data

US 2007/0220858 A1 Sep. 27, 2007

(30) Foreign Application Priority Data

Aug. 6, 2004 (FR) .................................. 04 08701

(51) Int. Cl.
*B63B 21/24* (2006.01)
(52) U.S. Cl. ........................... 114/293; 405/224
(58) Field of Classification Search .............. 114/230.2, 114/230.28, 293, 294, 301; 59/85, 93; 405/224; 441/3, 4, 5; 474/210
See application file for complete search history.

(56) References Cited

U.S. PATENT DOCUMENTS

| 2,679,818 | A |   | 6/1954 | Herbert et al. | ............... 114/230 |
| 2,824,421 | A | * | 2/1958 | Nelson | .......................... 59/85 |
| 3,453,822 | A | * | 7/1969 | Crook, Jr. | ....................... 59/85 |
| 3,994,127 | A | * | 11/1976 | Gower | ............................ 59/85 |
| 4,179,878 | A | * | 12/1979 | Albertini | ........................ 59/85 |
| 6,418,871 | B1 | * | 7/2002 | Simon | ........................ 114/293 |
| 6,663,320 | B1 |   | 12/2003 | Braud et al. | ................ 405/224 |

FOREIGN PATENT DOCUMENTS

| FR | 2 267 487 | 11/1975 |
| JP | 01132491 | 5/1989 |
| JP | 09240577 | 9/1997 |
| WO | WO 00/78599 | 12/2000 |

* cited by examiner

*Primary Examiner*—Lars A Olson
(74) *Attorney, Agent, or Firm*—Ostrolenk, Faber, Gerb & Soffen, LLP

(57) ABSTRACT

A transferring sea buoy is moored to the sea floor via an anchoring line. The anchoring line comprises a chain and an anchoring device for fastening the chain and the buoy. The anchoring device comprises a deformable longitudinal element having a first end connected to the transferring sea buoy and a second end connected to the chain. The deformable longitudinal element is deformable when the transferring sea buoy moves. The member has at least first and second portion of thin rectangular cross-section, each deformable in one plane to absorb relative motion between the buoy and the chain.

12 Claims, 3 Drawing Sheets

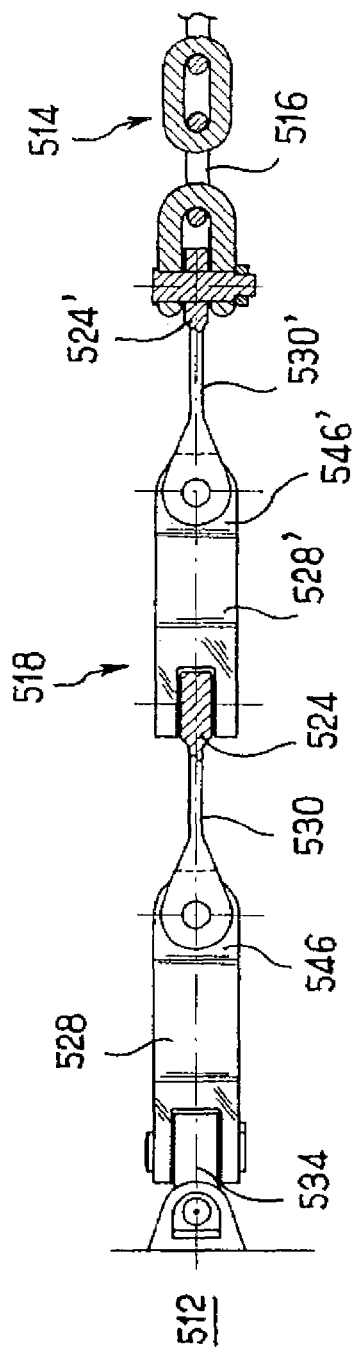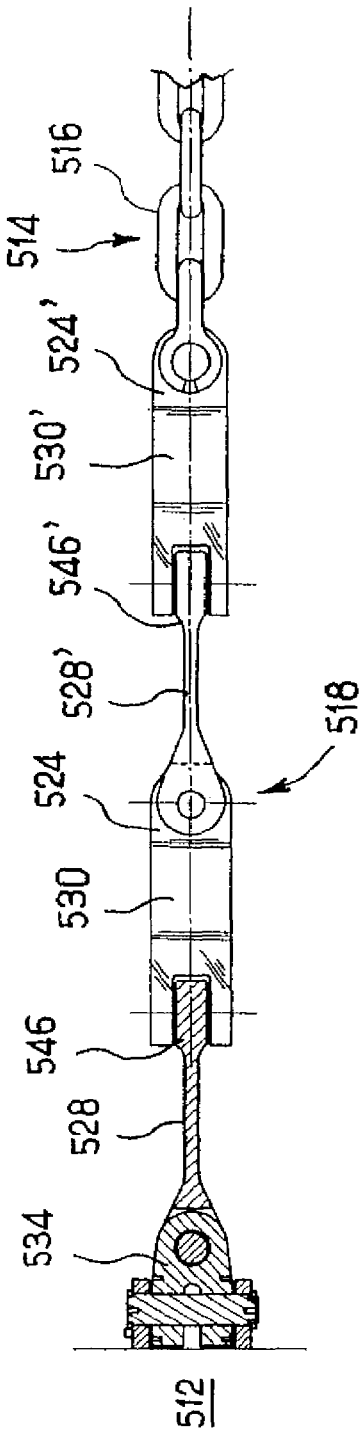

ANCHORING SYSTEM FOR INSTALLING IN A SURFACE MOVED ACCORDING TO HIGH-FREQUENCY MOVEMENTS

CROSS REFERENCE TO RELATED APPLICATION

The present application is a 35 U.S.C. §§ 371 national phase conversion of PCT/FR2005/001992, filed 29 Jul. 2005, which claims priority of French Application No. 0408701, filed 6 Aug. 2004. The PCT International Application was published in the French language.

BACKGROUND OF THE INVENTION

The present invention relates to an anchoring system for a surface installation subject to high frequency movements.

One specific proposed application is to marine loading buoys for transferring hydrocarbons, these buoys being adapted to float on the surface of the water.

These marine buoys are positioned in the vicinity of an oil platform which is installed above an undersea oil field. The marine buoys are then connected to the platform and the hydrocarbon is transferred from the platform to the buoys and passed from the buoys to a surface vessel moored to the buoy.

This marine loading buoy is obviously moored to the seabed by at least one anchor line extending between the buoy and the bed. This anchor line generally comprises a chain of which one end is anchored to the seabed and the other end is attached to the marine loading buoy by means of an attachment device. In some cases, these anchor lines are composite, having a central part composed of a cable, and two ends each terminating in a chain.

Although the marine loading buoy is generally moored with a plurality of anchor lines which are relatively tightly stretched, it is moved by the wind, the swell and/or the surface currents, in such a way that severe fatigue stress is exerted on these anchor lines and particularly on the links of the chains. This is because, unlike a ship or a platform which is relatively stable with respect to these surface movements because of its inertia, a marine loading buoy, being lighter, is constantly moved at high frequencies with respect to the anchor lines which retain it.

Thus, in order to attach the chain to the marine installation, anchor lines generally comprise an attachment device which is pivoted about two pivot pins. This attachment device has at least two flanges mounted with one pivoting on the other, one of the flanges being mounted rotatably in a shackle which is fixed to the marine installation, while the other flange is fixed to the chain.

This is because the frictional forces arising in the pivots create a resistive torque which is proportional to the coefficients of friction, to the tension of the chain and to the diameter of the pivot axis. To enable pivoting to take place, this resistive torque must be overcome by a torque created by the angle of deflection of the end of the chain with respect to the end of the flange. Although the links of the chains are capable of pivoting with respect to each other, it is found that the chain becomes virtually rigid because of the high degree of tension, and this torque can only be generated by the bending of the links. Although the angles of deflection are less than 1°, this bending still causes fatigue in the chain which can adversely affect its service life.

Above this angle, the torque is sufficient to cause the attachment device to pivot.

SUMMARY OF THE INVENTION

One problem which arises, and which the present invention is intended to overcome, is that of providing an anchor system for which the movements of said marine installation caused by the surface do not cause premature fatigue in the links of the chains and the breakage of these links.

For this purpose, the present invention proposes an anchor system for a marine surface installation which is subject to movements at a high frequency with respect to the seabed. The anchor system comprises an anchor line which extends between the marine installation and the seabed to moor the marine installation to the seabed. The anchor line allows movements of the marine installation around an equilibrium position. The anchor line comprises a chain and an attachment device for attaching the chain to the marine installation. According to the invention, the attachment device comprises a deformable longitudinal member which has two opposite ends, namely a first end fixed to the marine installation and a second end fixed to the chain. The deformable longitudinal member is adapted to be deformed during movements of the marine installation.

Thus one characteristic of the invention consists in the use of a deformable longitudinal member between the chain and the marine installation, such that, during the movements of the installation, this deformable longitudinal member can be effectively deformed in place of the chain links, and therefore the fatigue of the chain links is negligible.

In this arrangement, instead of the chain links becoming deformed or finally breaking, it is the deformable longitudinal member, specially designed for this purpose, that undergoes the deformations and absorbs them until the angle of deflection is sufficient for the torque to compensate said resistive torque. In this way, the service life of these anchor lines is prolonged.

The deformable longitudinal member is advantageously mounted between the aforesaid flange and the chain. If necessary, a flange, formed by a long link, could be mounted to enable the necessary deflection of the chain to be decreased, owing to the increase of the lever arm. On the other hand, the increase in this length is limited in terms of the dynamic behavior of the system and the dimensions of such a link would be too large to enable the marine installation to be handled and installed by the conventional installation means.

Advantageously, said first and second ends are mounted pivotably on said marine installation and on said chain respectively. Thus the system consisting of the marine installation, the deformable longitudinal member and the chain reaches its state of equilibrium and least stress more rapidly, thus considerably decreasing the wear.

In a particularly advantageous embodiment of the invention, said longitudinal member has at least one portion which can be deformed by deflection in a first plane, and at least one other portion which can be deformed by deflection in a second plane which is substantially perpendicular to said first plane. Thus the two portions, which can be deflected independently of each other, allow the bending or deflection of the longitudinal member in all possible directions. In this way, regardless of the relative displacements of the marine installation and the chain under tension, the longitudinal member absorbs these displacements.

In a first, particularly advantageous, embodiment of the invention, said portions are formed by two parts mounted pivotably with respect to each other. The mounting of the longitudinal member is therefore easier.

In a second embodiment of the invention, said longitudinal member has three portions, one portion fixed to said marine transfer buoy, one portion fixed to said chain, and a third intermediate portion which connects the other two portions. Thus, because of this third intermediate portion, the amplitude of deflection is increased by a substantial increase in the length of the deformable longitudinal member, and furthermore a third direction of curvature in a third plane is favored. However, this third portion can be mounted in such a way as to be bent in a third plane which is substantially parallel to one of the other two favored planes.

Preferably, said deformable longitudinal member has a rectangular cross section which gives it a favored direction of deflection, in a plane perpendicular to its wider side. If the deformable longitudinal member has a plurality of portions, each of said portions has a rectangular cross section in this arrangement.

In a variant embodiment of the invention, the cross section of the deformable longitudinal member decreases from said first end towards said second end in such a way that its cross sectional moment of inertia also decreases in parallel. Thus, when the deformable longitudinal member is deflected, its radius of curvature is substantially constant from the first end, which is fixed to the marine installation, to the second end, which is fixed to the chain. Consequently, the deformable longitudinal member allows a more uniform distribution of the stresses acting on it.

Advantageously, the cross sectional moment of inertia of said deformable longitudinal member is less than the mean moment of inertia of a chain link, being for example less than $10 \times 10^{-6}$ m$^4$. This cross sectional moment of inertia is comparable, for example, with the moment of inertia of $12 \times 10^{-6}$ m$^4$ of the arms of a chain link measuring approximately 0.5 m in length, where the diameter of each arm is close to 0.125 m.

The moment of inertia of said deformable longitudinal member is, for example, $7.2 \times 10^{-6}$ m$^4$, in other words approximately equal to the cross sectional moment of inertia of a longitudinal member having a rectangular section of 60 mm×400 mm, made from steel. However, the greatest width of the longitudinal member in cross section can be in the range from 400 mm to 800 mm, while its thickness can be in the range from 50 mm to 100 mm. Additionally, any alloy, such as a titanium alloy, can be used in place of steel.

Additionally, another object of the invention relates to a marine loading buoy equipped with an anchor system as described above, said anchor system comprising a plurality of anchor lines so as to limit the drift of the marine loading buoy.

BRIEF DESCRIPTION OF THE DRAWINGS

Other characteristics and advantages of the invention will be made clear by the following description of specific embodiments of the invention, provided for information and without restrictive intent, with reference to the attached drawings, in which:

FIG. 5A is a partial schematic view in longitudinal section of an anchor line in a fifth embodiment; and FIG. 5B is a schematic view in longitudinal section of the object shown in FIG. 5A taken at a viewing angle shifted through 90°.

DESCRIPTION OF PREFERRED EMBODIMENTS

Figure 1A:
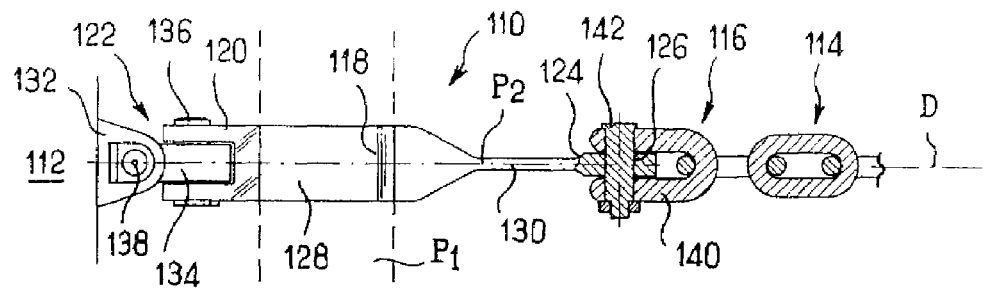
FIG. 1A is a partial schematic view in longitudinal section of an anchor line according to the invention in a first embodiment.
Figure 1B:
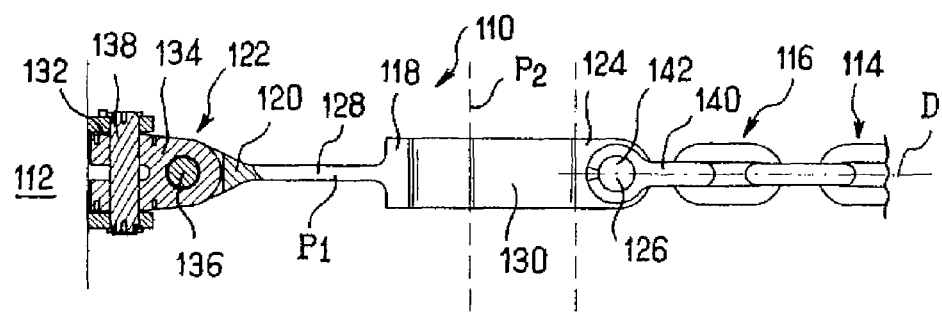
FIG. 1B is a schematic view in longitudinal section of the object shown in FIG. 1A taken at a viewing angle shifted through 90° in a plane perpendicular to said anchor line.

FIGS. 1A and 1B show an attachment device 110 according to the invention which connects, for example, in a mean longitudinal direction D, a marine loading buoy 112 and a chain 114 of which only one end 116, located in the vicinity of the water surface, is shown here. The other end of the chain 114 is anchored in the seabed. In FIG. 1A, the attachment device 110 is oriented perpendicularly to the wall of the marine loading buoy 112 to simplify the drawing. However, in the real situation, this wall is positioned substantially vertically and the attachment device 110 is inclined downward toward the seabed.

The attachment device 110 comprises a deformable longitudinal member 118 which has two opposing ends, namely a first end 120 terminating in a first shackle 122 and a second end 124 in which a transverse hole 126 is formed. This deformable longitudinal member 118 has two substantially identical portions with a rectangular cross section, namely a first portion 128 terminating in the first end 120 and a second portion 130 terminating in the second end 124; the two portions 128 and 130, which define two planes P1 and P2 respectively, are twisted with respect to each other in the longitudinal direction D in such a way that the planes defined by them are substantially perpendicular to each other.

The attachment device 110 also comprises, at the first end 120, a second shackle 132 fixed to the marine loading buoy 112 and a connecting flange 134 having two ends in which two openings, perpendicular to each other, are respectively formed; one of the ends being mounted pivotably in the first shackle 122 by means of a first pin 136, while the other end is mounted pivotably in the second shackle 132 by means of a second pin 138. At the second end 124, the attachment device 110 comprises a stirrup 140 hooked into the last end link 116 of the chain 114 and having its two free ends linked by a third pin 142 which also passes through the transverse hole 126 of the second end 124.

The deformable longitudinal member 118 has, for example, portions of rectangular cross section, having a thickness of 0.06 m and a width of 0.4 m, corresponding to a cross sectional moment of inertia of approximately $7.2 \times 10^{-6}$ m$^4$, allowing these portions to be deflected in the conditions of use described below.

When the chain 114 is under tension, the tensile forces are so strong that all the elements of the attachment device 110 form a rigid system and the smallest movement of the marine loading buoy 112 will not cause the deformation of the chain 114 whose cross sectional moment of inertia is at least greater by two thirds than that of the deformable longitudinal member, nor the pivoting of the connecting flange 134 about the pins, but will cause the deformation of the deformable longitudinal member 118 in one and/or the other of its portions 128, 130. This is because, allowing for differences in the moment of inertia, the deformation resistance of the chain is greater than the deformation resistance of the deformable longitudinal member 118. In the situation as shown in FIG. 1A, when the marine loading buoy 112 is, for example, made to rock in a direction opposite to the chain 114, only the second portion 130 of the deformable longitudinal member 118 is deflected in its thickness in a plane perpendicular to the plane P2 which it defines, the first portion 128 then operating according to its width in its plane P1 and not being deformed.

On the other hand, if the marine loading buoy 112 is moved not by rocking, but in a perpendicular direction, by rotation about its own axis for example, it is not the second portion 130 of the deformable longitudinal member 118 that is deflected, but the first portion 128, which then operates according to its thickness in a plane perpendicular to the plane P1 which it defines. However, the movements of the marine loading buoy 112 rarely occur only in the plane P1 or in the plane P2, but generally between the two planes, in such a way that the two portions 128, 130 of the deformable longitudinal member 118 are deflected simultaneously without the deformation of the chain 114, which prevents the premature ageing of the chain links by fatigue.

References will now be made to FIGS. 2A and 2B which show a second embodiment of an attachment device 210 according to the invention. These figures similarly show an attachment device 210 which connects a marine loading buoy 212 and a chain 214.

The only difference is in the deformable longitudinal member 218, which is not formed from a single twisted part but from two separate parts which are pivoted with respect to each other. A first part 228 whose first end 220 terminates, as in the preceding embodiment, in a shackle 222, and a second part 230 having a second end 224 in which in which a transverse hole 226 is formed. The first end 220 and the second end 224, respectively, of the first part 228 and the second part 230 are connected, respectively, to the marine loading buoy 212 and to the chain 214, by means identical to those described with reference to FIGS. 1A and 1B, and are not described again here.

On the other hand, the first part 228 has a second end 246 in which a hole 248 is formed, while the second part 230 has a first end 250 which terminates in a third shackle 252 adapted to receive the second end 246. Thus the second end 246 and the first end 250 are interconnected by means of a fourth pin 254 which extends in the third shackle 252 and through the hole 248.

Additionally, as in the preceding embodiment, the parts 228, 230, which are homologous to the portions 128 and 130 respectively, have the same cross section, and they are adjusted in such a way that the planes which they define, P1 and P2, are oriented perpendicularly to each other.

Thus, when the chain 214 is under tension, the system of elements of the attachment device 210 form a rigid system, despite the pivoting of the two parts 228, 230, and, as in the preceding embodiment, the parts 228 and 230 are most often deflected simultaneously during movements of the marine loading buoy 212. On the other hand, if the chain becomes slack, for example if the depth of water above the seabed decreases, the first part 228 and the second part 230 can then pivot not only with respect to each other but also, respectively, with respect to the marine loading buoy 212 and with respect to the chain 214, enabling the tensions to be relieved.

Figure 3A:
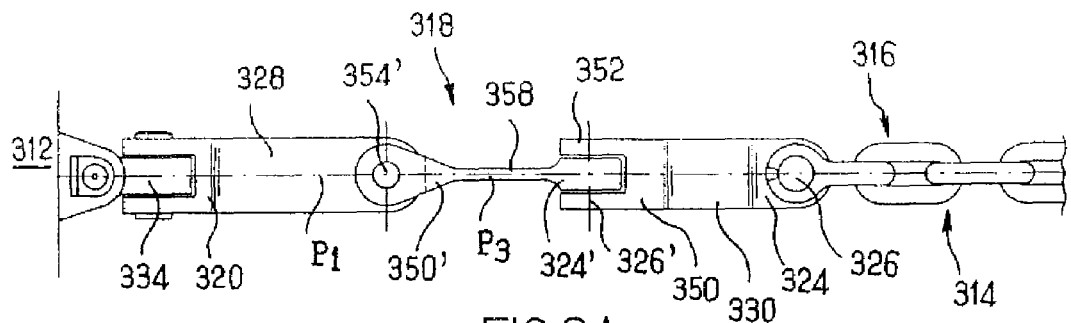
FIG. 3A is a partial schematic view in longitudinal section of an anchor line in a third embodiment.
Figure 3B:
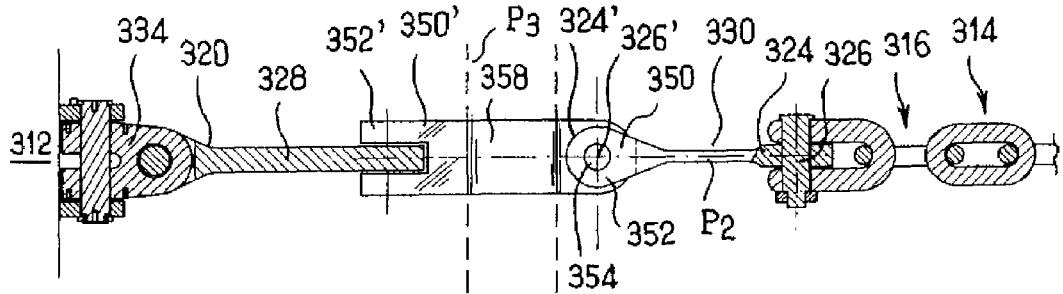
FIG. 3B is a schematic view in longitudinal section of the object shown in FIG. 3A taken at a viewing angle shifted through 90°.

Reference will now be made to FIGS. 3A and 3B which show an attachment device 310 according to a third embodiment. This attachment device 310 again connects a marine loading buoy 312 and a chain 314, and, as in the preceding embodiment, it has a deformable longitudinal member 318, which comprises a first part 328 and a second part 330, not mounted pivotably together but connected by an intermediate part 358. This intermediate part 358 is identical to the second part 330, which is connected to the end of the chain 316 in a way identical to that seen in the preceding embodiments.

Beside the addition of an intermediate part 358, the first part 328 has a thickness which is substantially twice that of the first part 228 of the embodiment described above on the right of FIGS. 2A and 2B, and which corresponds to an arm or a link. The details of operation of this arrangement are explained below.

However, this intermediate part 358 also has a rectangular cross section, and it has the same dimensions as the second part 330. It also has a third shackle 352' at its first end 350' and a second end 324' in which a transverse hole 326' is formed. Additionally, the second part 330 has a first end 350 terminating in a third shackle 352 and a second end 324 in which a transverse hole 326 is formed.

Thus, the first part 328 is mounted pivotably on a connecting flange 334 in a similar way to that seen in the preceding embodiments. This first part 328 has a thickness of 0.15 m for example, while the width of approximately 0.4 m remains unchanged. The intermediate part 358 which defines a plane P3 is mounted pivotably on the first part 328 by means of a fourth pin 354', in such a way that the plane P1 is substantially perpendicular to the plane P3, and the second part 330 is mounted pivotably on the second end 324' of this intermediate part 358 by means of the fourth pin 354 which passes through both the third shackle 352 and the transverse hole 326' of the second end 324' of the intermediate part 358. Thus the first part 328 and the second part 330 are substantially coplanar.

Thus the cross section of the parts decreases between the first part 328 and the intermediate part 358, in such a way that the latter part, and therefore the second part 330, are deflected with a greater amplitude than the first part 328 which is deflected very little. Globally, therefore, the deformable longitudinal member 318 has a smaller radius of curvature toward the second end 324, while this radius is greater in the vicinity of the marine loading buoy 312. Thus the deformable longitudinal member 318, and in particular the second part 330 and the intermediate part 358, can be deflected and perform their function fully to prevent the deformation of the chain 314.

Figure 4A:
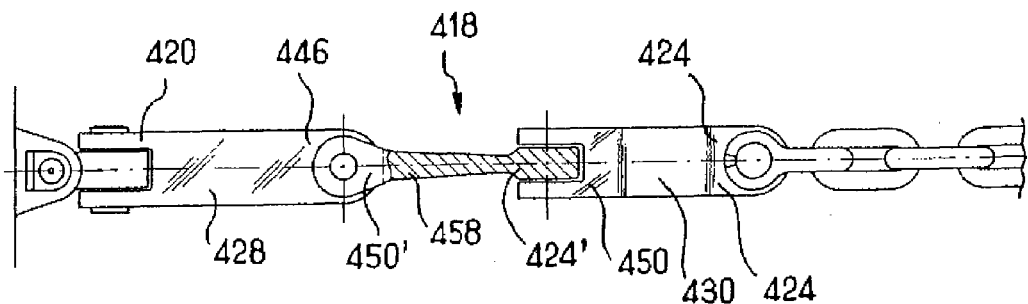
FIG. 4A is a partial schematic view in longitudinal section of an anchor line in a fourth embodiment.
Figure 4B:
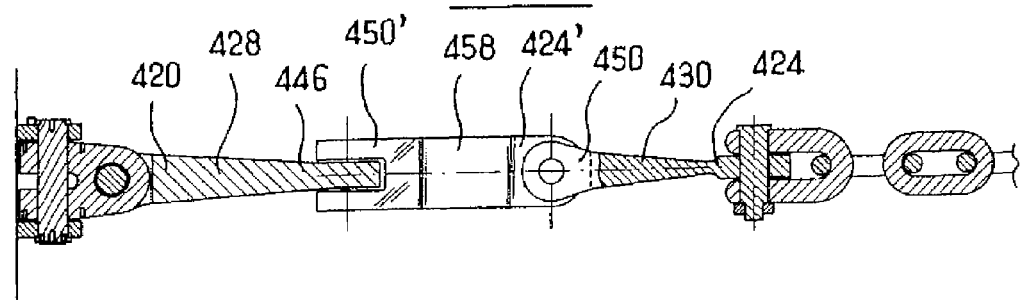
FIG. 4B is a schematic view in longitudinal section of the object shown in FIG. 4A taken at a viewing angle shifted through 90°.

Reference will now be made to FIGS. 4A and 4B, which show a fourth embodiment for achieving the deflection of a deformable longitudinal member 418 whose radius of curvature decreases in a substantially continuous way between a first end 420 and a second end 424.

As in the preceding embodiment, the deformable longitudinal member 418 comprises an intermediate part 458 similar to a second part 430, both being mounted pivotably on each other in the same way. However, their rectangular cross section is not constant here, but variable, decreasing from a first end 450', 450 toward a second end 424', 424 respectively for the intermediate part 458 and the second part 430.

Additionally, a first part 428 also has a cross section decreasing from the first end 420 toward a second end 446. On the other hand, as in the third embodiment, this first part 428 has a cross section in proportion, which is substantially twice that of the intermediate part 458 and the second part 430. Thus, as a result of this last embodiment, each of the parts is adapted to be deflected in a plane perpendicular to that which it defines, but with a radius of curvature which decreases from the thickest to the thinnest end, in a substantially continuous way along the part concerned. Thus, when the discontinuities of deflection of the deformable longitudinal member are decreased, the forces which it has to withstand are distributed in a substantially uniform way, and thus its potential service life is prolonged.

In this embodiment, the cross sections of the parts pivoting with respect to each other are always rectangular. However, in another embodiment which is not shown, parts with circular cross sections are used, in order not to favor any particular plane of deflection.

Figure 2A:
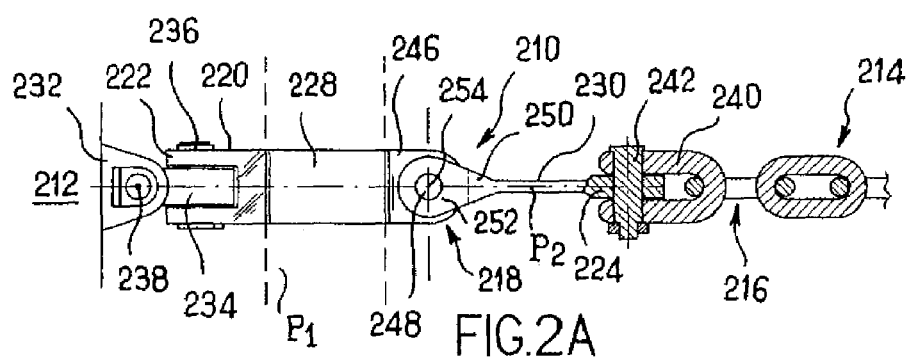
FIG. 2A is a partial schematic view in longitudinal section of an anchor line in a second embodiment.
Figure 2B:
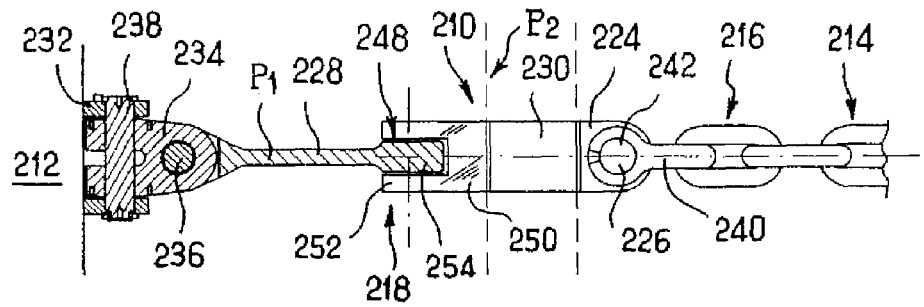
FIG. 2B is a schematic view in longitudinal section of the object shown in FIG. 2A taken at a viewing angle shifted through 90°.

Finally, in a fifth embodiment of the invention, shown in FIGS. 5A and 5B, a deformable longitudinal member 518 consists of two deformable longitudinal members 218, as shown in FIGS. 2A and 2B, mounted end to end in such a way as to connect a marine loading buoy 512 and a chain 514.

Thus these figures show a first first part 528 mounted pivotably on a connecting flange 534 and a first second part 530 which is pivoted on a second end 546 of the first first part 528. In turn, a second first part 528' is mounted pivotably on a second end 524 of the first second part 530, while a second second part 530' is mounted pivotably on a second end 546' of the second first part 528'. This second second part 530' has a second end 524' which is connected to the end 516 of the chain 514.

Thus, this deformable longitudinal member 518 has four substantially identical parts which are mounted in succession pivotably on each other and in alternating perpendicular planes. Thus the length of the deformable longitudinal member 518 is twice that of the deformable longitudinal member 218 shown in FIGS. 2A and 2B, and it allows at least twice the degree of deflection when a substantially equivalent stress is undergone.

In yet another embodiment of the invention (not shown), the deformable longitudinal member is fitted to an adjustable attachment device. This device has a first tubular member oriented substantially vertically and fixed to the marine installation, and a second tubular member mounted pivotably in the lower part of said first member. The chain can be guided in translation in said tubular members, and the lower end of the second tubular member has means for locking the chain. When the chain is locked in the tubular members with respect to translation, the movements of the marine installation can also cause the deformation of the chain. In order to overcome this, the first tubular member is fitted with a deformable longitudinal member in place of the second member, to which said chain locking means are fixed. Thus the deformable longitudinal member can absorb the stresses acting on the chain when the marine installation is moved.

The invention claimed is:

1. An anchor system for a surface marine installation, said anchor system comprising
    an anchor line which extends between said marine installation and a seabed to moor said marine installation to said seabed, said anchor line being operable to allow movements of said marine installation around an equilibrium position,
    said anchor line comprising a chain, an attachment device operable to attach said chain to said marine installation;
    said attachment device comprising a deformable longitudinal member having a first end fixed to said marine installation and an opposite second end fixed to said chain;
    said deformable longitudinal member has at least one first portion which can be deformed along said first portion and in a thickness direction of said first portion by deflection in a first plane and at least one other second portion which can be deformed along said second portion and in a thickness direction of said second portion by deflection in a second plane substantially perpendicular to said first plane, during movements of said marine installation and wherein said first portion is not deflectable in said second plane and said second portion is not deflectable in said first plane.

2. The anchor system as claimed in claim 1, wherein said first end and said second end are mounted pivotably on said marine installation and on said chain, respectively.

3. The anchor system as claimed in claim 1, wherein said first and second portions are formed by two respective parts mounted pivotably with respect to each other.

4. The anchor system as claimed in claim 1, wherein said deformable longitudinal member comprises three portions, including said first portion fixed to said marine installation, said second portion fixed to said chain and a third intermediate portion which connects said first and second portions.

5. The anchor system of claim 4, wherein at least one of said portions of said deformable longitudinal member has a cross section decreasing from said first end to said second end.

6. The anchor system as claimed in claim 1, wherein at least one of said first and second portions of said deformable longitudinal member has a rectangular cross section.

7. The anchor system as claimed in claim 1, wherein at least one of said first and second portions of said deformable longitudinal member has a cross section decreasing from said first end to said second end.

8. The anchor system as claimed in claim 1, wherein said deformable longitudinal member has a cross sectional moment of inertia that is less than a cross sectional moment of inertia of a link of said chain.

9. The anchor system as claimed in claim 1, wherein said deformable longitudinal member is comprised of steel.

10. A marine loading buoy equipped with an anchor system as claimed in claim 1, wherein said anchor system comprises a plurality of said anchor lines.

11. The anchor system as claimed in claim 1, wherein each of said first and second portions of said deformable longitudinal member has a rectangular cross section.

12. An anchor system for a surface marine installation, said anchor system comprising
    an anchor line which extends between said marine installation and a seabed to moor said marine installation to said seabed, said anchor line being operable to allow movements of said marine installation around an equilibrium position,
    said anchor line comprising a chain, an attachment device operable to attach said chain to said marine installation;
    said attachment device comprising a deformable longitudinal member having a first end fixed to said marine installation and an opposite second end fixed to said chain;
    said deformable longitudinal member has at least one first portion which can be deformed along said first portion and in a thickness direction of said first portion by deflection in a first plane and at least one other second portion which can be deformed along said second portion and in a thickness direction of said second portion by deflection in a second plane, during movements of said marine installation and wherein said first portion is not deflectable in said second plane and said second portion is not deflectable in said first plane.

* * * * *